Sept. 26, 1933.          C. M. F. FRIDEN          1,928,125
CALCULATING MACHINE
Filed May 20, 1929          4 Sheets-Sheet 1
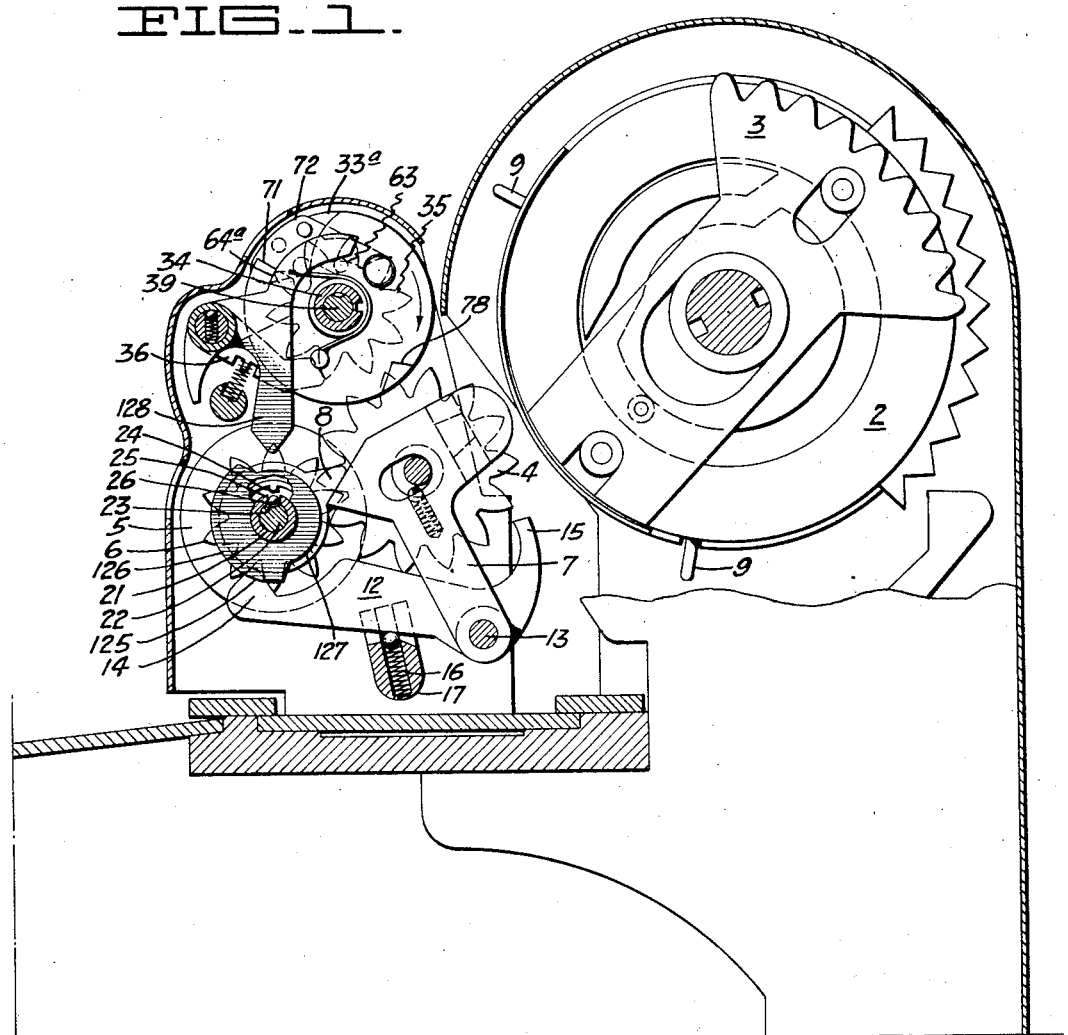
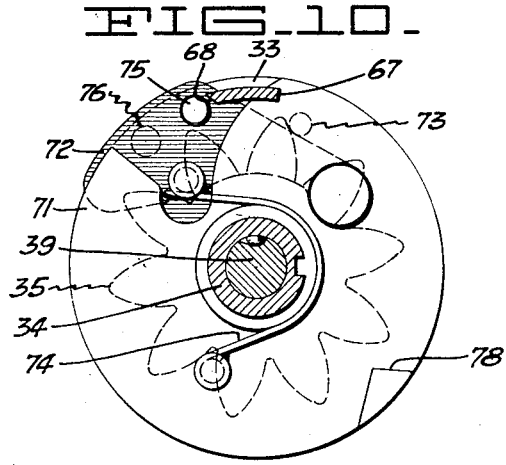
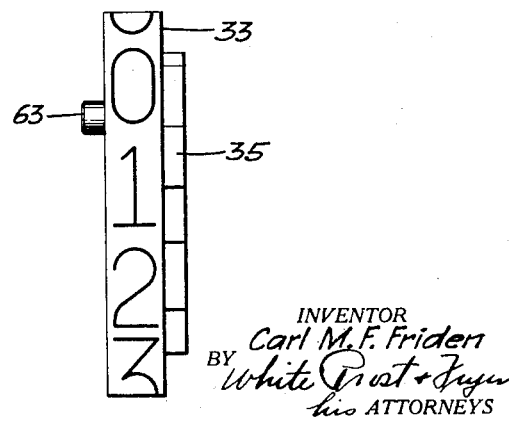
INVENTOR
Carl M. F. Friden
BY White Prost + Fryer
his ATTORNEYS

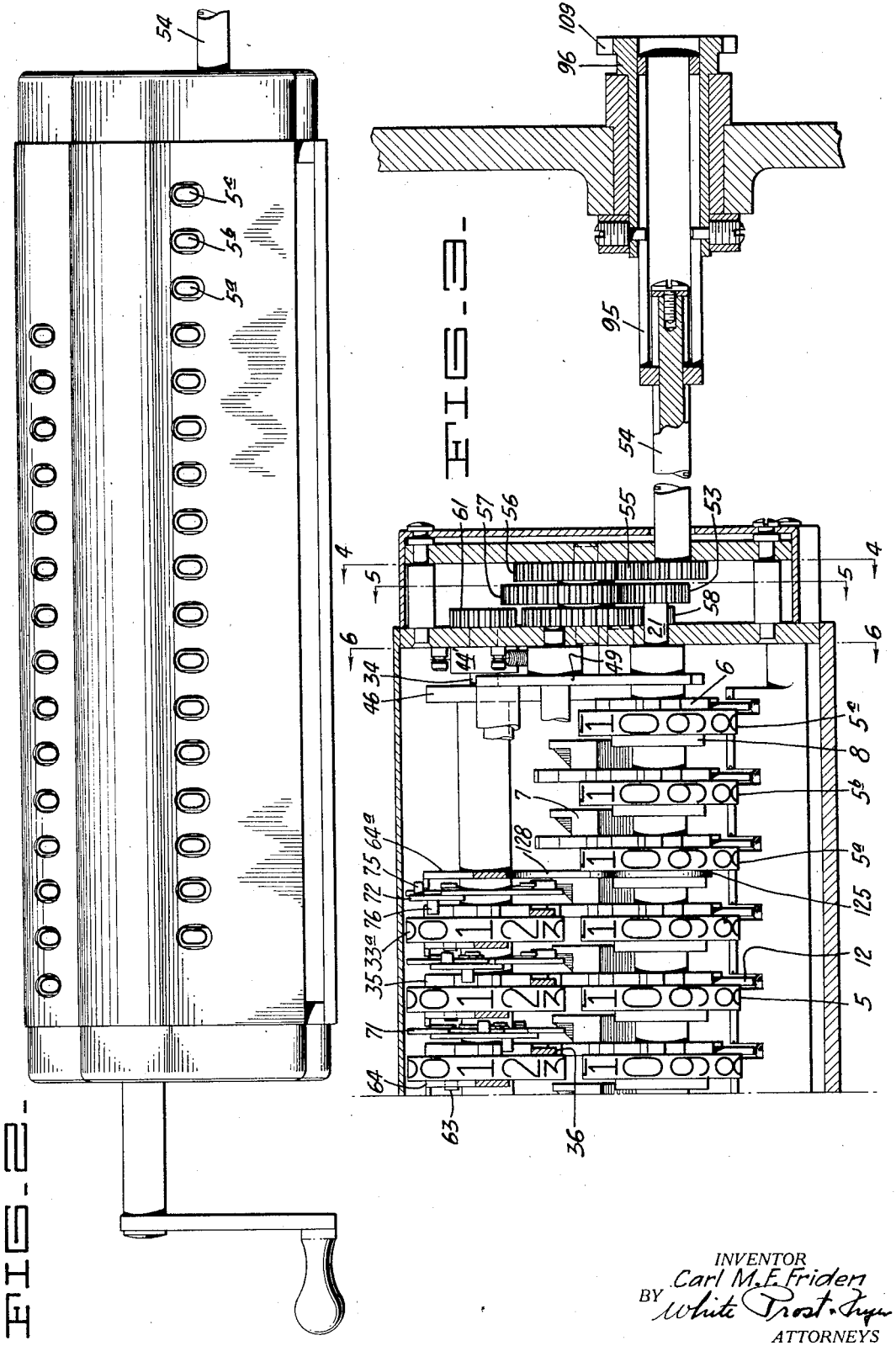

Sept. 26, 1933.  C. M. F. FRIDEN  1,928,125
CALCULATING MACHINE
Filed May 20, 1929    4 Sheets-Sheet 3
FIG_4
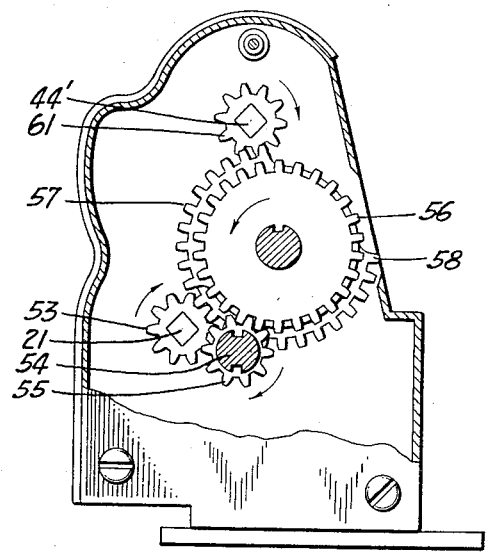
FIG_5_
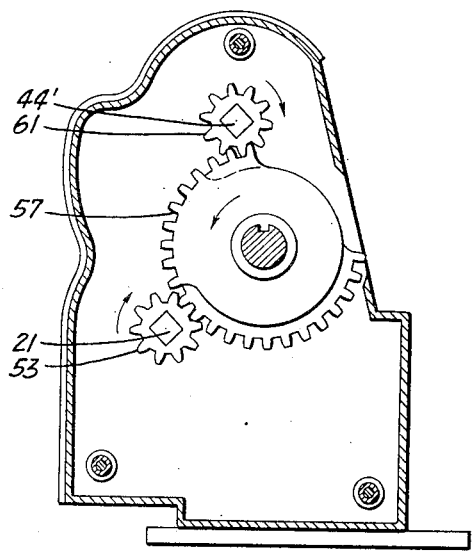
FIG_6_
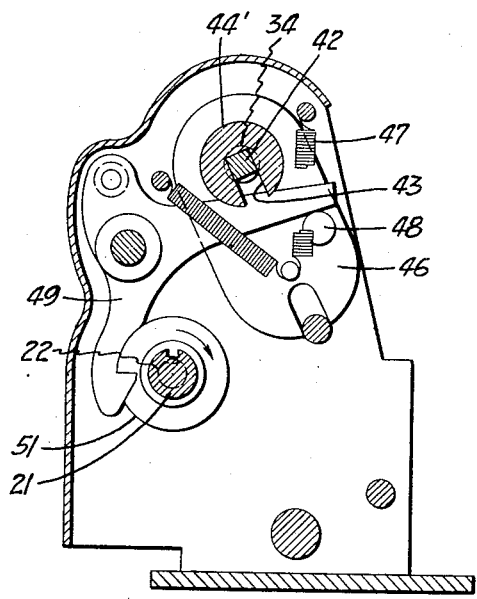
FIG_7_
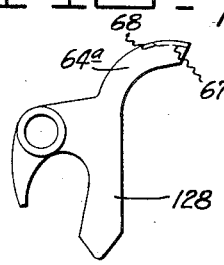
FIG_8_
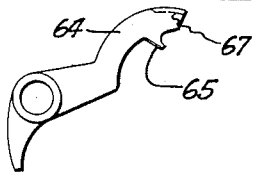
INVENTOR
Carl M.F. Friden
BY White Frost Fryer
ATTORNEYS Patented Sept. 26, 1933

1,928,125

UNITED STATES PATENT OFFICE 1,928,125

CALCULATING MACHINE

Carl M. F. Friden, Oakland, Calif., assignor to Marchant Calculating Machine Company, Emeryville, Calif., a corporation of California Application May 20, 1929. Serial No. 364,397

8 Claims. (Cl. 235—73)

The invention relates to calculating machines adapted to perform problems in addition, subtraction, multiplication and division.

An object of the invention is to provide a calculating machine having a product register and a grand total register with means for converting an actual value in the product register to a practical value in the grand total register.

Another object of the invention is to provide a calculating machine which will convert the terminal fraction of the value appearing in the product register, to the closest whole number in the grand total register.

The invention possesses other advantageous features, some of which with the foregoing, will be set forth at length in the following description, where I shall outline in full that form of the invention which I have selected for illustration in the drawings accompanying and forming part of the present specification. In said drawings, I have shown one embodiment of my invention, but it is to be understood that I do not limit myself to such form, since the invention, as set forth in the claims, may be embodied in a plurality of forms.

Referring to said drawings:

Fig. 1 is a vertical transverse section through a portion of the calculating machine, showing the product register, the grand total register and the means for transferring values from the product register to the grand total register.

Fig. 2 is a front elevation of the transversely displaceable carriage on which the product register and the grand total register are mounted.

Fig. 3 is a vertical longitudinal section through the carriage showing the two registers.

Fig. 4 is a section taken on the line 4—4 of Fig. 3.

Fig. 5 is a section taken on the line 5—5 of Fig. 3.

Fig. 6 is a section taken on the line 6—6 of Fig. 3.

Fig. 7 is a detail of the tens transfer lever associated with the numeral wheel of lowest value in the grand total register.

Fig. 8 is a detail of the tens transfer levers associated with the remaining numeral wheels of the grand total register.

Fig. 10 is a section through the grand total register showing the tens carrying mechanism in operative position.

Fig. 11 is a front elevation of one of the numeral wheels of the grand total register.

Figure 9:
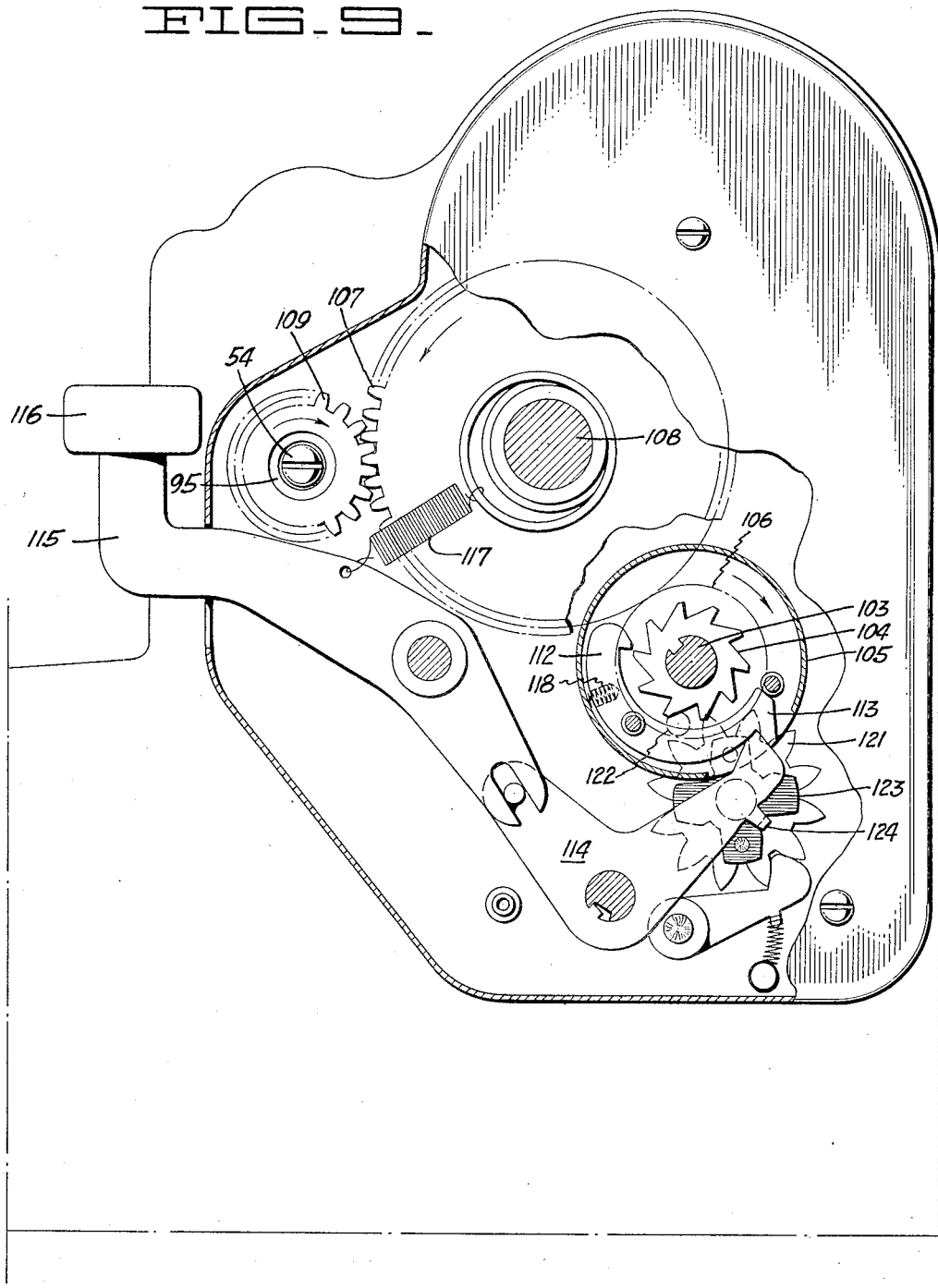
Fig. 9 is an end view of a portion of the machine, parts of the casing being broken away and other parts being shown in sections, to show the mechanism for controlling the application of power for the purpose of transferring values from the product register to the grand total register and operating the tens carrying mechanism of the grand total register.

The invention relates to calculating machines of type shown in my United States Letters Patent No. 1,643,710 of September 27, 1927, to which reference is hereby made for a disclosure of a complete calculating machine of this type, since features of the calculating machine not involved in the present invention are not disclosed in this application. The present invention relates particularly to the incorporation in the machine, of a grand total register, which is associated with the product register and with the means for transferring registered values from the product register to the grand total register. The machine shown in the patent and in the present application is arranged to be driven by an electric motor, but it is to be understood, that the invention is equally well applicable to a hand driven machine. As far as I am aware, calculating machines have heretofore been provided with means for transferring the actual value accumulated in the product register, into the grand total register. The purpose of the present invention is to provide means for transferring to the grand total register, a practical value, which may or may not be the actual value accumulated in the product register. By virtue of this invention, a fractional value appearing in the product register, appears in the grand total register as the nearest whole value.

The machine is particularly adaptable for use in operations which require the accumulation of a plurality of products, some or all of which may contain fractions, in the present instance decimal fractions. The machine may be particularly advantageously employed in the computation of pay rolls. In this work, the amount of each individual pay check is calculated and the total of all of the checks is accumulated in the grand total register. It is the custom for the operator to write on a chart opposite the employee's name, the amount of the check and then clear the product register and transfer such amount into the grand total register. The amount accumulated in the grand total register, represents the entire pay roll. It is the custom of many organizations to maintain a separate banking account for pay-roll purposes and, after the payroll has been totaled, a deposit, equal to the amount of the total, is made in the payroll account, for the purpose of taking care of the individual payroll checks. It frequently happens however in calculating the individual pay checks, that the actual amount registered includes mills or fractions of a cent. It is impossible to pay the employee the mills, and as a consequence the custom has been established, of deducting the mills from the product, if they amount to less than five and for calling the mills one cent if they amount to five or more. The product register shows the actual value, that is dollars, cents and mills, but the operator takes off and writes on the chart, the practical value, that is, dollars and cents. Heretofore, however, the actual values appearing in the product register have been accumulated in the grand total register with the result, that the sum of the actual values appearing in the grand total register and the sum of the practical values as written by the operator on the chart have not coincided, so that there has been a discrepancy greater than several cents between the accumulated grand total and the total of the checks. The result has been therefore that the check deposited by the employer in the payroll account has not been an amount equal to the sum of the checks with the result, that the bank, believing an error to have been made, was put to the necessity of checking and rechecking the entire transaction in an endeavor to find the error. At times, the check deposited in the payroll account would be insufficient to take care of the individual checks, when presented for payment.

In accordance with the present invention, I provide means for converting the actual value, as it appears in the product register, into the practical value which is written on the chart by the operator and transferring the practical value to the grand total register, so that the total appearing in this register is identical with the sum of all of the checks written. Since the usual custom is to neglect all mills less than five and to call all mills of five or more equal to one cent, I have constructed the present machine to accumulate these practical values in the grand total register.

As an example of the presence of mills in the employees' payroll, assume that the employee has worked 42.75 hours at eighty-five cents per hour. The actual cost of his time is $36.3275, that is thirty-six dollars, thirty-two cents and seven and one-half mills. It is customary to call this $36.33 and, in accordance with my invention, when $36.3275 appears in the product register, when this register is cleared, $36.33 is transferred into the grand total register. Similarly, should the actual value of the employee's time equal $35.9125, the machine will operate to transfer $35.91 to the grand total register. While I have illustrated the use of the machine in connection with figuring payrolls, it is to be understood that it is not limited to such use but may be advantageously used in any situation wherein the actual value appearing in the product register is converted to a practical value.

The machine includes a reversible, rotary actuator 2, which is fully described in my said patent above referred to, in which values are introduced, preferably by the depression of keys, and which on rotation transfers the introduced values to the numeral wheels of the product register, which, for the purpose of making direct action of the selected values on the figure disc of highest value possible, is disposed in parallel displaceable relation to the axis of the actuator. The product register is mounted in a carriage which is displaceable longitudinally into registry with the actuating elements of the actuator, in different numerical orders.

The actuator comprises a plurality of actuating elements 3, which cooperate on rotation of the actuator in either direction, with the intermediate wheels 4 of the product register. This register comprises a series of numeral wheels 5, each wheel being provided on one side with a gear 6, which is in mesh with its associated intermediate gear 4. Each numeral wheel 5 is provided with a transfer lever 7 which is moved to operative position by a projection 8 carried by the numeral wheels and which is returned to inoperative position by a restoring cam carried by the actuator. Tens carrying pins 9 carried by the actuator, serve to move the numeral wheel of the next higher order, one step, on rotation of the actuator when the transfer lever 7 has been moved to operative position. This is well understood in the art and is fully disclosed in my said patent above referred to. Means are provided for causing the numeral wheels 5 to move in a step-by-step movement and to prevent their overthrow when driven by the actuating element 3. For this purpose, an escapement latch 12 is provided for each numeral wheel. The plurality of latches are rotatably mounted on a rod or shaft 13 and each latch is provided at one end with a tooth 14 adapted to engage between the adjacent teeth of the gear 6 and at the other end, with a tooth 15 adapted to engage between adjacent teeth of the intermediate gear 4. The escapement latches are normally held in spring pressed engagement with the teeth of the gear 6, by the spring 16 seated in the rocking bar 17, the function of which will appear hereinafter. Upon rotation of the intermediate gear 4 by the actuator element 3, the escapement latch 12 is rocked, causing a step-by-step movement of the numeral wheels 5.

The numeral wheels 5 are rotatably mounted on a normally stationary hollow shaft 21 in which is disposed a stationary inner shaft 22 provided with a longitudinal groove 23. Each numeral wheel has an enlarged bore and disposed in the bore is a tooth 24 which, when the numeral wheel is in zero position, is disposed in radial alignment with a hole 25 through the hollow shaft 21. The groove 23 is normally in registry with the series of holes 25 and, in each hole, there is disposed a ball 26 which, upon rotation of the outer shaft with respect to the inner shaft is forced out of the groove in the inner shaft so that it projects beyond the periphery of the outer shaft. When the numeral wheel 5 is out of zero position, the projected ball engages the tooth 24 and carries the numeral wheel back to zero position at which position, the ball 25 recedes into the groove 23, thereby moving out of engagement with the tooth 24. The product register is reset to zero by rotating the outer hollow shaft 21 and this shaft may be rotated by hand or by an electric motor. Suitable means, such as is shown in my copending application Serial No. 246,677, may be employed for rotating the hollow shaft 21 to reset the figure disc of the product register to zero. These means include mechanisms for causing the release of the latches 12 on the initial movement of the hollow shaft, so that the numeral wheels may be readily returned to zero position.

Mounted in the carriage adjacent the product register is a grand total register comprising a series of numeral wheels 33, these numeral wheels being preferably in alignment with the numeral wheels 5 of the product register, except that in the present instance, there are no numeral wheels in the grand total register associated with the last three numeral wheels in the product register. The purpose of this omission of the numeral wheels in the grand total register, will be set forth hereinafter. Numeral wheels 33 are rotatably mounted on a normally stationary rotatable shaft 34 and each numeral wheel 33 is provided on one side with a gear 35 which is normally out of mesh with the intermediate gear 4 and which is movable into mesh with said intermediate gear, as will be set forth hereinafter. Each numeral wheel 33 is provided with a spring pressed detent 36 which engages between adjacent teeth of the gear 35 to prevent overthrow of the numeral wheel and to cause said wheels to move with a step-by-step movement. The numeral wheels 33 are provided with zero resetting devices which are identical with the zero resetting devices of the product register. The grand total register numeral wheels 33 are reset to zero by rotating the outer shaft 34 while the inner shaft 39 is held stationary.

In order to transfer values from the numeral wheels 5 to the numeral wheels 33, it is necessary to bring these wheels into engagement and, in the present instance this is accomplished by moving the grand total register bodily transversely to bring the gear wheels 35 into mesh with the intermediate gear wheels 4. To permit this bodily movement of the grand total register, the outer shaft 34, on which the numeral wheels 33 are rotatably mounted, is provided at its ends with squared portions 42 which seat in straight sided slots 43 formed in hubs 44 and 44' which are rotatably mounted in the frame of the carriage. The hubs 44 and 44' are normally stationary and the slots therein are normally parallel to a line connecting the axes of the shafts 22 and 39. Normally, the axis of the shaft 34 is in alignment with the axis of rotation of the hubs 44, so that when the hubs are rotated, the shaft 34 is also rotated. In this normal position, the gears 35 of the grand total register are out of mesh with the gears 4.

Means are provided for moving the grand total register bodily, transversely into cooperative relation with the product register. Adjacent each end, the shaft 34 is journalled in slides 46 which are slidable in the direction of the line intersecting the axes of the shafts 22 and 39 and which slides are normally held in elevated or raised position by the springs 47. Projecting from each slide is a pin 48 which is engaged by a lever 49, the other end of which is in engagement with a cam 51 secured to a driven shaft 21 arranged in the carriage so that upon the initial rotational movement of the shaft 21, the lever 49 is rocked to move the slides 46 downward, bringing the gears 35 into mesh with the intermediate gears 4. At the completion of the rotation of the shaft 21, the springs 47 return the grand total register to its normal or elevated position. The driven shaft 21 is journalled in the frame of the carriage and is provided with a gear 53 which is given one complete revolution during the operation of transferring values from the product register to the grand total register. Journalled in the frame of the carriage is a driving shaft 54 to the end of which is secured a gear 55 which is in mesh with a gear 56. Mounted on the same shaft with and secured to the gear 56, so that they all rotate in unison, are two mutilated gears 57 and 58. The gear 57 is co-planar with and is adapted to mesh with the gear 53. These two gears have the same number of teeth, in this instance 10 teeth, so that the shaft 21 is given one complete rotation for each complete rotation of the gear 56. The gear 58 is co-planar with and is adapted to mesh with the gear 61 which is secured to the hub 44' which carries one end of the hollow shaft 34. In the particular construction shown herein, it is desirable that the hub 44' be given two complete revolutions for each revolution of the gear 56 and therefore, gear 58 is provided with 20 teeth and the gear 61 is provided with 10 teeth. The gears 57 and 58 are so arranged with respect to each other and with respect to the gears 53 and 61, that, upon rotation of the gear 56, the gear 57 first meshes with and rotates the gear 53 for one revolution, and moves out of mesh with the gear 53 before the gear 58 moves into mesh with the gear 61. Further, during the time that the gear 58 is in mesh with the gear 61, the gear 57 is always out of engagement with the gear 53. Values are transferred from the numeral wheels of the product register to the numeral wheels of the grand total register, by resetting the numeral wheels of the product register to zero, the movement of the numeral wheels 5 during this operation serving to transfer the values to the numeral wheels of the grand total register, through the gears 6, 4 and 35. The shaft 21, to which the gear 53 is secured, is the zero resetting shaft of the product register. The initial rotational movement of this shaft serves to move the grand total register into engagement with the product register and the further movement of this shaft serves to transfer the values from the product register to the grand total register and at the completion of one rotation of the shaft 21 the product register is moved to elevated or normal position. The tens carrying mechanism of the grand total register, which is operated by the gears 61 is then brought into operation to carry tens into the grand total register, so that the value appearing therein is the correct accumulated value except, in the last numerical position, where the value is a practical value rather than an actual value. The grand total register is provided with tens carrying means which are operated by rotation of the hollow shaft 34 and the inner shaft 39. The tens carrying members for the successive numeral wheels of the product register must necessarily be spaced apart angularly so that they are successively brought into operation during the rotation of the shaft. I have found that in a grand total register having nine numeral wheels, that the tens carrying mechanism is fully operated by one rotation of the shaft, but since it is usually desirable to provide a grand total register having at least twelve numeral wheels, I have provided means for giving the tens carrying shaft two complete revolutions, thereby providing for all of the tens carrying devices. Should more than 20 wheels be required in the grand total register, it will be necessary to so proportion the gears 58 and 61, that the shaft 34 will be given three complete rotations.

Each numeral wheel 33 is provided on the side opposite the gear 35 and ajacent to numeral wheel of next higher order, with a pin or projection 63. Pivoted on a shaft parallel to the shaft of the grand total register, are a plurality of arms 64 which extend into the spaces between the successive numeral wheels, there being one arm associated with each numeral wheel. The arm is provided on its under surface adjacent its inner end with a cam tooth 65 against which the pin 63 lies, when the numeral wheel is in zero position, the additive direction of movement of the numeral wheel is clockwise (Fig. 1), and, when the numeral wheel has moved nine steps in an additive direction, the projection 63 is in contact with the other side of the cam tooth 65. One more additive movement of the numeral wheel causes the projection 63 to force the cam tooth 65 upward, so that in a movement of the numeral wheel from nine to zero, the arm 64 is rocked upward. The arm is provided on its inner end with a curved shoe 67 having a beveled forward edge 68. Under the action of the projection 63, on the numeral wheel, the shoe 67 is moved outward, substantially, radially from inoperative to operative position. Secured to the shaft 34 between each two numeral wheels is a disc 71 and pivoted to the disc is a lever 72 which is normally held in outward position against the stop 73 by a spring 74. The lever 72 is provided with two pins, the pin 75 projecting from one side of the lever and the pin 76 projecting from the other side. The pin 75 projects from the side of the disc which lies toward the numeral wheel of lower order and is disposed in a recess or cut out portion of the disc. The pin 76 lies on the side adjacent the numeral wheel of next higher order and is co-planar with the gear wheel 35 which is secured to said numeral wheel of next higher order. The pin 75 is normally disposed in a circular plane which lies outside the plane of the shoe 67 when the shoe is in its inner position. When the shoe is moved to its outer position however, it lies in the path of the pin 75, so that upon rotation of the disc 71, the pin contacts with the beveled end 68 of the shoe and is moved inward, moving the lever 72 and consequently the pin 76 inward. The pin 76 is so disposed, that when the lever 72 is in its outer position, the pin passes the teeth of the gear 35 and when the lever 72 is moved to its inner position, the pin 76 engages the tooth of the gear 35. The lever 72 is held depressed by the shoe 67 and the shoe is of such length that the lever is held depressed for sufficient time to cause the pin 76 to move the gear 35 and consequently the numeral wheel 33, one step. As the pin 75 passes out from under the shoe 67, the spring 74 moves the lever 72 outward, moving the pin 76 from engagement with the tooth of the numeral wheel 35.

The disc 71 also carries means for restoring the transfer arm 64 to inner or inoperative position, after the shoe 68 thereon has functioned to cause a transitional carrying to the numeral wheel of the next higher order. Secured to or formed on the disc 71, preferably substantially, diametrically opposite the pin 75, is a cam 78 which, on rotation of the disc, contacts with the shoe 68 and moves the shoe inward to inoperative position.

In transferring values from the product register to the grand total register, one or more of the numeral wheels of the grand total register will pass through zero, moving the associated shoes 67 outward. The transitional carry to the respective wheels of next higher order, is accomplished by rotation of the shafts 34 and 39, the rotation of the shaft 39 being necessary in order to prevent the operation of the zero resetting means. Rotation of the shaft 34 causes rotation of the disc 71 secured thereto and such rotation causes the pins 75 to contact with the extended shoes 67, and effect the transitional carry to the numeral wheels of next higher order. The levers 72 are respectively spaced apart angularly on the successive discs so that the transitional carry is successfully performed on the successive discs of increasing numerical order. The completion of the rotation of the discs brings the cam 78 into operation to return the transfer arm 64 to normal inoperative position. The shaft 34 is given one or more complete rotations depending upon the number of numeral wheels in the grand total register. The shafts 34 and 39 are yieldingly coupled together by spring pressed pawls. These pawls serve to normally cause the two shafts to rotate together, but also serve to permit rotation of the outer shaft while the inner shaft is held stationary in the zero resetting operation. As shown in my copending application Serial No. 246,677 filed January 14, 1928, means are provided for causing rotation of the shaft 34 in a clockwise direction for the purpose of operating the tens carrying mechanism and for rotating it in a counter-clockwise direction for the purpose of resetting the numeral wheels 33 to zero. This mechanism includes clutch means which are fully disclosed in my copending application. During the zero resetting operation, it is necessary that the inner shaft 39 remain stationary and in my said copending application, I have shown means whereby the shaft 39 is locked against rotation when this operation is being performed.

The present machine is particularly designed for motor drive and means have been provided under the control of the operator, for causing the motor to drive the mechanism for the required time to move the grand total register into engagement with the product register for resetting the product register to zero and transferring the values therein to the grand total register, and for operating the transfer mechanism of the grand total register, and then stopping the parts in neutral or full-cycle position, and this is accomplished, regardless of the longitudinally displaced position of the carriage on the frame of the machine. The driving shaft 54 of the various devices mounted on the carriage, is connected to a floating shaft 95 which is in turn connected to the driving hub 96 which is journalled in the frame of the machine, thereby providing a telescopic driving connection between the driving hub 96 and the driving shaft 54 of the carriage mechanism.

The machine is driven by a motor which drives through suitable reduction gearing, to the shaft 103. Secured to the shaft 103 is a ratchet pinion 104 which forms part of a clutch, the other part comprising the clutch housing 105. Secured to the clutch housing is a gear 106 which meshes with a gear 107 rotatably mounted on the shaft 108 which in turn meshes with a gear 109 which is secured to the driving hub 96. The ratchet pinion 104 is driven during the time of operation of the motor and means are provided for controlling the connection of the ratchet pinion with the gear 109. Journalled on the shaft 103 is a clutch housing 105 in which is mounted a pawl 112 which is provided with a foot 113 which lies adjacent an aperture in the clutch housing. The pawl 112 is normally held out of engagement with the pinion 104 and the clutch housing is normally held stopped in full-cycle position by the clutch lever 114 which extends through the aperture in the housing and engages the foot 113 on the pawl. Connected to the lever 114 is a control lever 115 which extends outside of the casing where it is provided with a key 116. Depression of the key 116, rocks the clutch lever 114, against the influence of the spring 117, moving the clutch lever out of engagement with the foot 113 and permitting the spring 118 to move the pawl 112 into engagement with the ratchet pinion 104, thereby causing rotation of the clutch housing 105 and consequently rotation of the gears 107 and 109. In order to perform the various functions required in transferring values from the product register to the grand total register, it is necessary, in the present construction, that the clutch housing 105 rotate a plurality of times, in the present instance three times and means are provided for holding the clutch control lever 114 out of engagement with the clutch housing for three revolutions, even though the key 116 has been previously released. In operation however it is customary merely to tap the key 116 and to rely on the mechanism for stopping the clutch housing in full-cycle position after the required number of revolutions thereof. Rotatably mounted adjacent the clutch housing is a gear 121 which is advanced one tooth for each rotation of the clutch housing, by contact of the pin 122 on the side of the clutch housing, with the gear. Secured to the side of the gear is a multiple cam 123 having alternate raised and depressed portions, and engaging the cam is a foot 124 projecting laterally from the clutch control lever 114. The foot 124 is normally disposed in one of the depressed portions of the cam and, upon movement of the clutch control lever 114, to cause engagement of the clutch, the cam 123 is moved to position an elevated portion thereof under the foot 124, and the cam is so designed, to hold the clutch control lever 114 out of engagement with the clutch housing for three revolutions of the clutch. The cam permits the clutch lever to move back into engagement with the housing, in advance of the completion of the third rotation of the clutch housing, so that as the foot 113 of the clutch pawl contacts with the end of the clutch lever 114, the clutch is disengaged and the clutch housing is locked in full-cycle position.

The product register is preferably provided with three numeral wheels disposed at the right of the numeral wheels in the grand total register, the first numeral wheel 5A of this series of three wheels, serving to indicate mills, the second numeral wheel 5B serving to indicate tenths of mills and the third numeral wheel 5C serving to indicate hundredths of mills. The factors are entered into the machine so that the numeral wheel 5A will register mills. No means are provided for transferring the actual values registered on the numeral wheels 5A, 5B and 5C to the numeral wheels of the grand total register. Means are provided however whereby the practical value of the actual value shown in the numeral wheel 5A, is transferred to the first numeral wheel 33A of the grand total register. Secured to the side of the numeral wheel 5A is a cam 125 having a high space 126 corresponding to the numerals 5 to 9 inclusive of the numeral wheel 5A and a low space 127 corresponding to the numerals 0 to 4 inclusive on the numeral wheel 5A. The tens transfer lever 64A associated with the numeral wheel 33A and serving to cause the pins carrying mechanism of the grand total register to advance the numeral wheel 33A one step, is provided with an extension 128 which cooperates with the cam 125 to position the lever 64A. The lever 64A is normally held in depressed position, in which position it does not function to cause a tens carrying movement of the numeral wheel 33A. The lower end of the projection 128, is normally disposed in a plane above the circular pass of the high portion 126 of the cam 125. When the grand total register is depressed however to bring it into engagement with the product register, for the purpose of transferring values from the product register to the grand total register, the lower end of the extension 128 moves into contact with either the high face 126 or the low face 127 of the cam 125, depending upon the position of the numeral wheel 5A. In the event that the numeral wheel 5A indicates values from 0 to 4 inclusive, the low face 127 of the cam will underlie the projection 128 and such projection will move into contact with the low face. In the event however that the high face 126 of the cam, which represents indicated values of 5 to 9 inclusive on the numeral wheel 5A should underlie the lower end of the extension 128, downward movement of the grand total register toward the product register, will bring the lower end of the extension 128 into contact with the high face 126, rocking the tens transfer lever 64A, raising the shoe 67 thereon, so that, on rotation of the shaft of the grand total register, the pin 75 will engage the shoe 67, and rock the tens transfer lever 72 to move the pin 76 into engagement with the gear 35 on the side of the numeral wheel 33A, and advance said numeral wheel one step. The numeral wheel 33A represents cents. Therefore, in the event that the numeral wheel 5A of the product register indicates more than four mills, the tens carrying mechanism of the grand total register will move the first numeral wheel 33A one step. Should the mills numeral wheel 5A of the product register indicate less than five mills, the tens carrying mechanism associated with the numeral wheel 33A of the grand total register will not be actuated and the numeral wheel 33A will not be advanced by the tens carrying mechanism. Therefore, by virtue of this construction, all mills less than five, in the product register, will be erased whereas all mills greater than four will be transferred as one cent to the grand total register. The grand total register will therefore register the practical value whereas the product register registered the actual value. When the grand total register is reset to zero, the projection 65 on the transfer lever lying to the left of the numeral wheel 33A, serves to position such numeral wheel in zero position. The transfer lever 64A serves no such function with respect to the numeral wheel 33A, and therefore the projection 65 is omitted from the transfer lever 64A, since it has no function on such lever.

I claim:

1. In a calculating machine having product and grand total accumulators, the combination of means for concurrently clearing the entire product accumulator, means controlled by said clearing means for entering the amount standing on certain orders of said product accumulator into said grand total accumulator, and means controlled by the remaining orders of said product accumulator for controlling a unitary entry in one order of said grand total accumulator.

2. In a calculating machine, a grand total accumulator having tens carrying mechanism associated therewith, a product accumulator, means controlled by said product accumulator for entering an amount standing upon certain orders thereof into said grand total accumulator comprising means for clearing said product accumulator, and means controlled by the remaining orders of said product accumulator during the operation of said clearing means for controlling the said tens carrying mechanism associated with said grand total accumulator.

3. In a calculating machine, a product register comprising registering elements, a grand total register, means for transferring a value from the product register to the grand total register comprising means for simultaneously resetting the registering elements of said product register to zero and means operative during the transferring operation for converting the actual value in the product register into a practical value.

4. In a calculating machine, a product register, a grand total register, means for transferring values from the product register to the grand total register and means comprising elements associated with the grand total register for converting the actual value to an arbitrary value in the grand total register.

5. In a calculating machine, a product register, a grand total register into which values are transferred from the product register means including a tens carrying transfer lever in the grand total register for converting the actual value in the product register to an arbitrary value in the grand total register, and means for throwing said transfer lever comprising means for sensing said product register while it is motionless.

6. In a calculating machine, a product register comprising registering elements adapted to receive values, a grand total register, means for simultaneously resetting the registering elements of the product register to zero, means operated by the actuation of the zero resetting means for transferring values from the product register to the grand total register and means controlled by said resetting means for converting the actual value to be transferred into a practical transferred value.

7. In a calculating machine, a product register comprising a series of numeral wheels, a grand total register comprising a series of numeral wheels adapted to be operated by the numeral wheels of the product register, tens carrying means associated with the numeral wheels of the grand total register and means for directly controlling the tens carrying means associated with the numeral wheel of lowest numerical order to control the value registered on said wheel by the numeral wheel of next lower order in the product register.

8. In a calculating machine, a product register comprising a series of register wheels arranged to be actuated by a differential actuator, a grand total register comprising a series of register wheels, means for moving the two series of wheels into engagement to transfer values from the product register to the grand total register independently of said differential actuator, tens carrying means associated with the register wheels of the grand total register and means associated with the product register for controlling said tens carrying means for converting the actual value in the product register to a practical value in the grand total register.

CARL M. F. FRIDEN.